United States Patent [19]
Yoneda

[11] Patent Number: 4,748,851
[45] Date of Patent: Jun. 7, 1988

[54] APPARATUS FOR SIMULTANEOUSLY VIBRATING SPECIMENS IN MULTIPLE DIRECTIONS

[75] Inventor: Sadayuki Yoneda, Hachioji, Japan

[73] Assignee: Shinken Co., Ltd., Tokyo, Japan

[21] Appl. No.: 944,205

[22] Filed: Dec. 22, 1986

[30] Foreign Application Priority Data

Dec. 26, 1986 [JP] Japan ................................. 60-292230

[51] Int. Cl.⁴ .............................................. B06B 1/04
[52] U.S. Cl. .................................................... 73/668
[58] Field of Search ................... 73/663, 665, 666, 668

[56] References Cited

U.S. PATENT DOCUMENTS 4,436,188 3/1984 Jones ....................................... 73/663
4,498,343 2/1985 Kimball .................................. 73/663

FOREIGN PATENT DOCUMENTS 0159782 12/1975 Japan ...................................... 73/663
60-183072 9/1985 Japan .
0171611 7/1965 U.S.S.R. ................................ 73/663
0629461 9/1978 U.S.S.R. ................................ 73/663

Primary Examiner—Stewart J. Levy
Assistant Examiner—Lawrence G. Fess
Attorney, Agent, or Firm—Sigalos & Levine

[57] ABSTRACT

Apparatus and method for vibrating a specimen in multiple directions. Exciters for vibration in the X and Y orthogonal directions are coupled to shafts extending through orifices in the hollow vibrator to X and Y control plates on the inside of the vibrator in contact with the interior walls thereof to move the vibrator in X and Y directions. A Z-axis exciter is coupled to the base of the vibrator for moving it in the Z-axis direction. The orifices for the X and Y-axis exciter shafts are sufficiently large to allow Z-axis movement of the vibrator without affecting the motions of the X and Y shafts.

6 Claims, 3 Drawing Sheets

APPARATUS FOR SIMULTANEOUSLY VIBRATING SPECIMENS IN MULTIPLE DIRECTIONS

BACKGROUND OF THE INVENTION

The present invention relates to a vibrating apparatus for applying simultaneous multi-directional vibrations to specimens.

In prior art vibrators, a hollow vibration shaft is fixed in a vertical direction with respect to the vibration table with a first exciter for producing vibration in a horizontal direction being coupled to the vibration shaft. A hydrostatic bearing allows slidable movement of the vibration shaft in the horizontal direction. Furthermore, a second exciter is coupled to the lower end of the vibration shaft by a hydrostatic bearing so as to allow slidable movement of the vibration shaft for producing vibration in a vertical direction. Since these two exciters are coupled to a single vibration shaft it has the advantages of being profitable economically and in terms of manufacturing as follows: (1) the apparatus can be miniaturized; (2) the vibration table is easily replaceable; (3) the generation of torsional vibrations such as rolling and pitching are reduced; (4) it is possible to obtain a large acceleration and a high frequency of vibrations; and (5) only a few guiding members are necessary.

The forementioned prior art vibrator is suitable mainly as a vibrator for applying vibration in two dimensions; that is, in the direction parallel to the vibration shaft and in a direction perpendicular to it. Therefore, it is difficult to utilize the above-mentioned vibrator as a two dimensional vibrator which simultaneously vibrates specimens in both of the orthogonal directions perpendicular to the axial direction or as a three dimensional vibrator which simultaneously vibrates specimens in the direction of the axis of the vibration shaft in addition to the other two orthogonal directions mentioned above.

It is an object of the present invention to provide an improved apparatus for vibrating specimens simultaneously in multiple directions by the use of a single vibration shaft.

It is another object of the present invention to provide a vibrator for applying vibrations simultaneously in multiple directions including at least the two orthogonal directions perpendicular to the axial direction of the vibration shaft.

It is still another object of the present invention to provide a highly effective vibrator suitable for applying vibrations to specimens simultaneously in the direction of the axis of a vibration shaft in addition to the other two orthogonal directions.

SUMMARY OF THE INVENTION

According to the present invention, in an apparatus for vibrating specimens simultaneously in multiple directions, the apparatus comprises a hollow vibration shaft for supporting or securing a vibration table to which specimens are fixed, a first pair of parallel spaced plates connected to each other on the interior of and in contact with the vibration shaft, a second parallel pair of spaced plates connected to each other on the interior of and in contact with said vibration shaft in a direction perpendicular to the direction faced by said first parallel spaced plates, a first pair of connecting shafts inserted through first openings formed in the vibration shaft with a clearance of at least the width of vibration of said shaft; said first pair of shafts being respectively connected to the first pair of parallel spaced plates for movement thereof in a direction perpendicular to the axis of said vibration shaft, a second pair of connecting shafts inserted through second openings formed in the vibration shaft with a clearance of at least the width of vibration; said second pair of shafts being respectively connected to the second pair of parallel spaced plates for movement thereof in a direction perpendicular to both said axis of said vibration shaft and the direction of movement of said first pair of plates, a first exciter coupled to at least one of the first pair of connecting shafts and applying through said first connecting shaft a vibration in a first direction, a second exciter coupled to at least one of the second pair of connecting shafts and applying through said second connecting shaft a vibration in a second direction perpendicular to said first direction and a third exciter for applying a vibration to said vibrator longitudinal axis. Therefore, vibration can be applied to specimens simultaneously in multiple directions including at least two orthogonal directions perpendicular to the longitudinal axis of the vibration shaft by the use of only a single vibration shaft without being required to enlarge the size of the vibrator. Since the vibrator applies vibrations to specimens using only a single vibration shaft, the vibration table is removable from the vibration shaft and torsional vibrations such as rolling and pitching are reduced. Moreover, a large acceleration and a high frequency of vibrations can be obtained and only a few guiding members are necessary making the vibrator advantageous both economically and in terms of manufacturing.

BRIEF DESCRIPTION OF THE DRAWINGS

In FIG. 1 and FIG. 2, specimen 4 and air spring 15 are shown in plan view and not in cross-section.

DETAILED DESCRIPTION OF THE DRAWINGS

Figure 1:
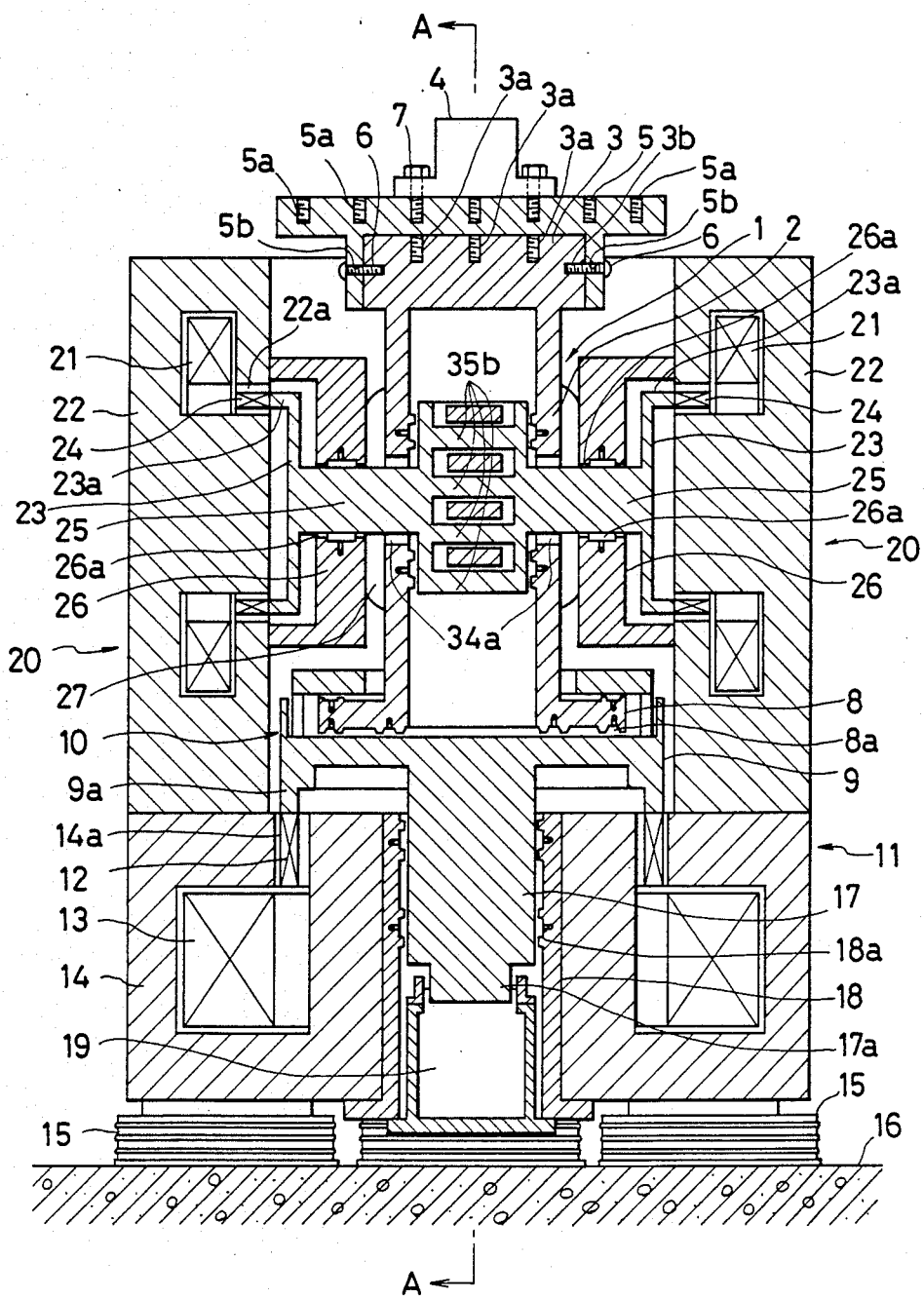
FIG. 1 is a partial sectional view showing the outline of an embodiment of a three dimensional vibrator of the present invention.

A vibrator according to the present invention and shown in the drawings is a three dimensional vibrator for vibrating specimens simultaneously in the longitudinal axis of a vibration shaft 1 and in the two directions perpendicular to the axis of the vibration shaft 1. Firstly, the structure of the vibrator will be described. The vibrator comprises the vibration shaft 1, a Z-direction exciter 11 for vibrating the vibration shaft 1 in its axial or longitudinal direction (vertical direction in FIG. 1 and FIG. 2), an X-direction exciter 20 and a Y-direction exciter 27 (see FIG. 2) by which the vibration shaft 1 is vibrated in two directions perpendicular to the axis of the vibration shaft (either right or left and into or out of the plan of the drawing in this embodiment shown in FIG. 1 and FIG. 2). When the exciters 11, 20 and 27 are driven simultaneously, a vibration is applied simultaneously in these three X, Y and Z directions to a specimen 4 which is secured directly or indirectly to the vibration shaft 1.

Figure 2:
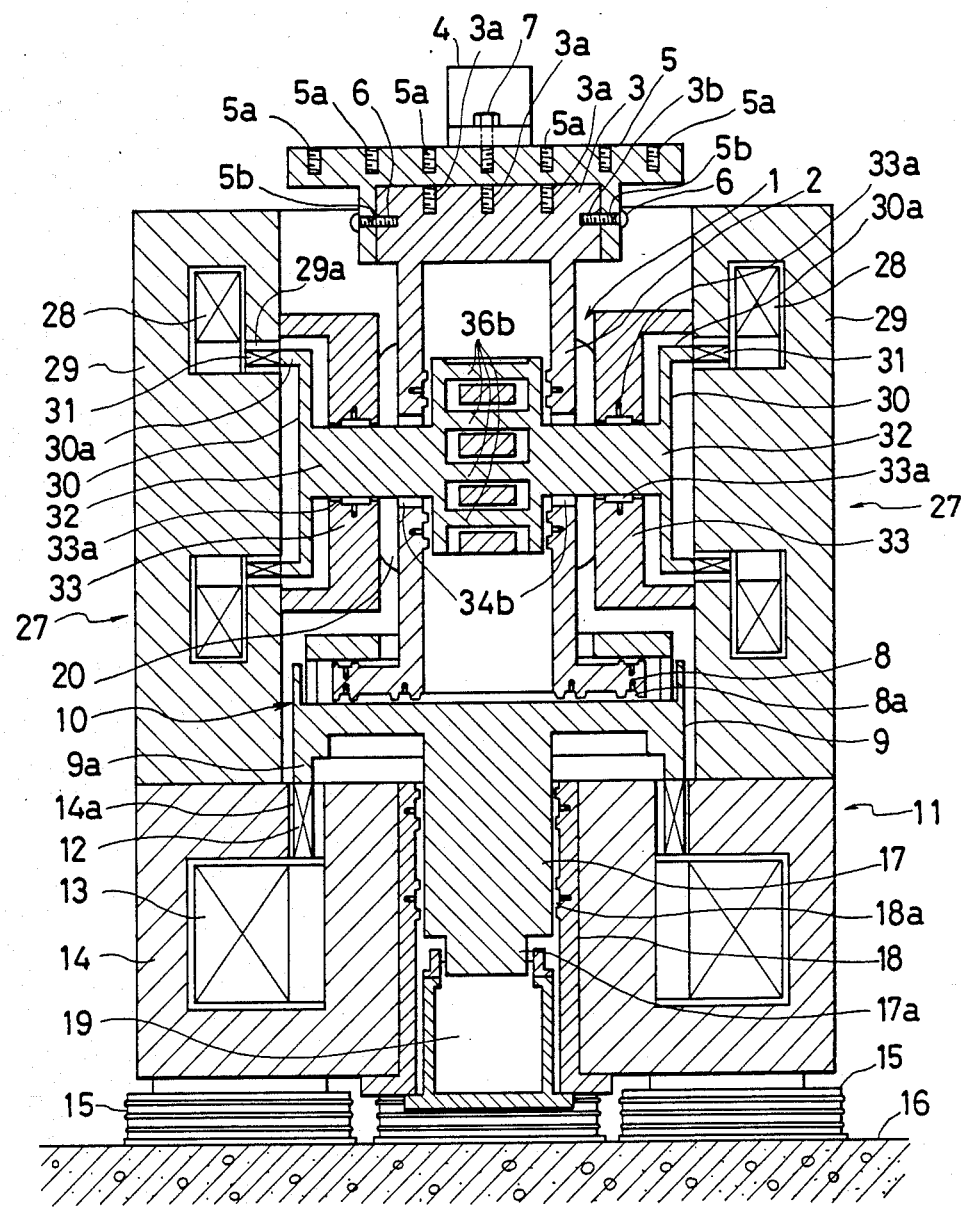
FIG. 2 is a partial sectional view taken on line A—A in FIG. 1.

The individual parts of the vibrator will now be described in relation to FIG. 1 and FIG. 2.

The vibration shaft 1 comprises a shaft portion 2 whose shape is a rectangular tube with a table 3 integrally formed at the upper end of the shaft portion 2. The table 3 has screw-holes 3a which are used for securing the specimen 4 thereto and screw-holes 3b for installing a removable table 5 to the table 3. The removable table 5 has screw-holes 5a for securing the specimen 4 and screw-holes 5b for securing the vibration table 5 to table 3. Removable tables of various sizes may be used. The removable table 5 is selected in accordance with the size of specimen 4 under test and is attached to the table 3 by screws 6. The specimen 4 is secured by screws 7 to the removable table 5. Moreover, it is also possible to secure the specimen 4 directly on to the table 3 by screws and screw-holes 3a without using the removable table 5.

Futhermore, a circular member 8 having a hydraulic guide 8a is integrally formed with the lower end of the shaft-portion 2 and a vertical coupling is formed by the circular member 8 being coupled to the circular table 9. The vibration shaft 1 can be vibrated in a vertical direction through the vertical coupling 10 by the Z-direction exciter 11. In this case, the vertical coupling 10 and other coupling members utilize the principle of hydraulics for sliding lubrication as shown in this embodiment and are well-known in the art.

The circular table 9 has a sleeve portion 9a formed on its periphery on which a driving coil 12 is wound. This driving coil 12 is provided inside an annular air gap 14a on the upper surface of the ring-shaped yoke 14 which has a ring-shaped exciting coil 13 provided inside. The driving coil 12 is driven in accordance with the energization of the exciting coil 13 as is well-known in the art. Moreover, the yoke 14 is provided with four air springs 15 on its lower surface through which the yoke 14 is fixed on top of the concrete base 16.

A Z-direction guide shaft 17 is integrally formed with and depends vertically from the lower central surface of the table 9 and is inserted into a guide bearing 18 which has been inserted into the central orifice of the yoke 14. The guide bearing 18 has a hydraulic guide 18a formed on its inner surface and is for guiding the shaft 17 slidably in the vertical or Z-direction in FIG. 1 and FIG. 2. A small diameter portion 17a is formed on the lower end of the Z-direction guide shaft 17 and is coupled to an air spring 19 which maintains the total weight of the movable portion of the vibrator.

Furthermore, a pair of X-direction exciters 20 are provided facing each other on either side of the shaft portion 2 of the vibration shaft 1. The X-direction exciters 20 comprise a driving coil 24 wound on a sleeve portion 23a formed on the periphery of the table 23 which is provided inside an air gap 22a in a yoke 22 wherein a ring-shaped exciting coil 21 is located. An X-direction guide shaft 25 is inserted through a guide hole 26a in the guide 26, orifice 34a in vibrator 1, is attached to plate 35a (FIG. 3) forming part of table 23 and is guided slidably in the axial X-direction.

Further, a pair of Y-direction exciters 27 are provided facing each other on the front side and the back side of the shaft portion 2 of the vibration shaft 1 (see FIG. 2) orthogonal to the X-direction exciters. These exciters 27 are of the same construction as the above-mentioned pair of X-direction exciters 20 and comprise an exciting coil 28, a yoke 29 having an air gap 29a, a table 30 having a sleeve portion 30a, a driving coil 31 wound on the sleeve portion 30a and provided within the air gap 29a of the yoke 29, a Y-direction guide shaft 32 coupled to the center of the table 30, and a guide 33 having an opening 33a. The Y-direction guide shaft 32 is inserted through guide hole or opening 33a in guide 33, orifice 34b in vibrator 1, is attached to plate 36a (FIG. 3) forming part of table 30 and is guided slidably in the Y-direction.

Figure 3:
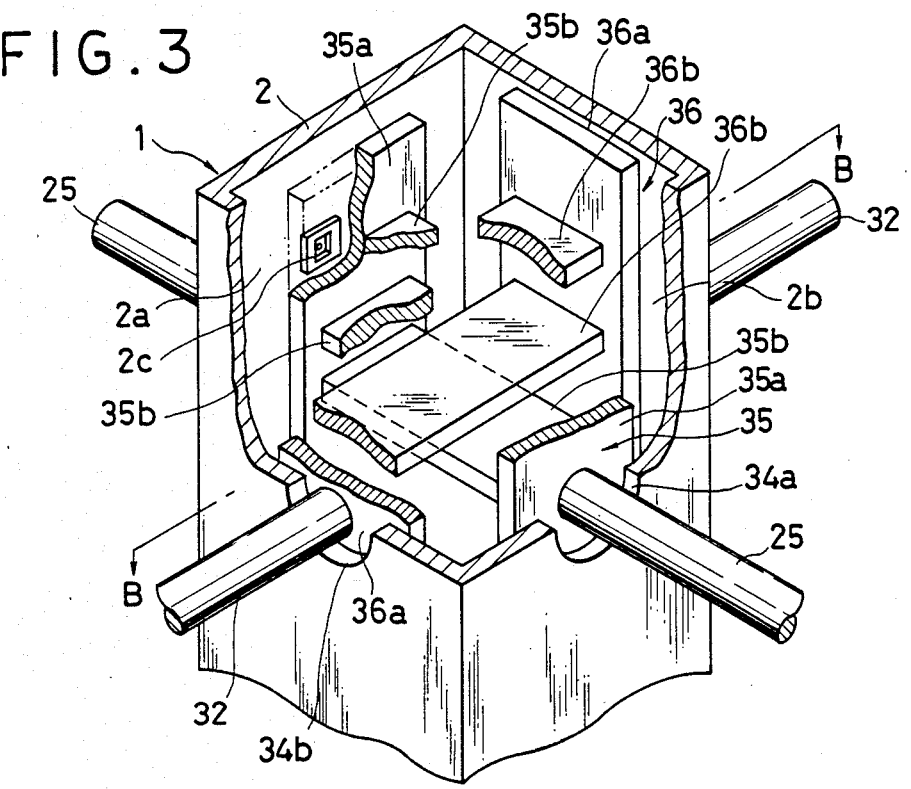
FIG. 3 is a partially broken perspective view showing the vibration shaft of the vibrator in FIG. 1 and FIG. 2.
Figure 4:
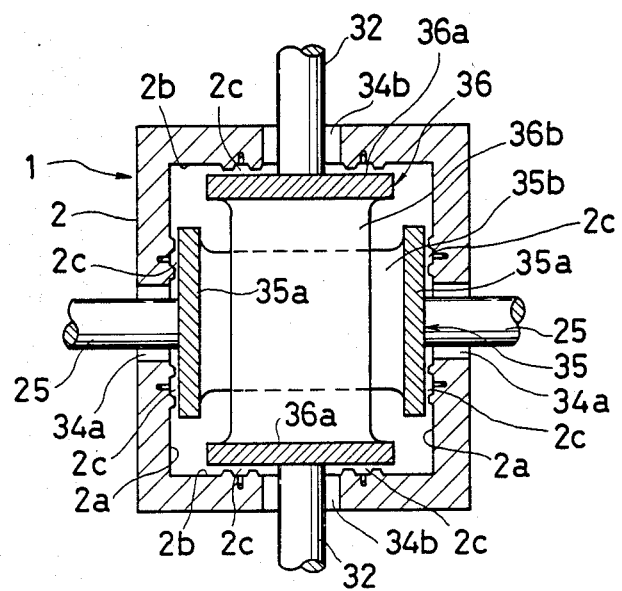
FIG. 4 is a transverse cross-sectional view taken on the line B—B in FIG. 3.

As can be seen from FIGS. 3 and 4, openings 34a and 34b are formed on each of the orthogonal sides of the shaft portion 2 of the vibration shaft 1. These openings 34a and 34b have a larger diameter than the X-direction guide shafts 25 and the Y-direction guide shafts 32 to allow them to be inserted therein with enough width of space to allow for the vibration of the vibrator shaft in the vertical direction. The pair of X-direction guide shafts 25 and the Y-direction guide shafts 32 are inserted with some clearance through the respective openings 34a and 34b and are respectively coupled with one of parallel, spaced plates 35a for movement in the X-direction and with one of parallel, spaced plates 36a for movement in the Y-direction. The pair of X-direction guide shafts 25 and the pair of Y-direction guide shafts 32 are in alignment with one another in the same plane.

A hydraulic pressure guide 2c is provided close to the openings 34a and 34b on the inner side surfaces 2a and 2b of the shaft portion 2. The X-direction coupling portion 35 is composed of a first parallel spaced pair of plates 35a whose surfaces are in slidable contact with the inner side surface 2a of the shaft portion 2. Four plates 35b connect the first pair of parallel spaced plates 35a and hold them in a fixed relationship.

Likewise, the Y-direction coupling portion 36 is composed of a second pair of parallel, spaced plates 36a whose surfaces are in slidable contact with the inner side surfaces 2b of the shaft portion 2. Four connecting plates 36b connect the second pair of spaced parallel plates 36a and hold them in a fixed relationship. The connecting plates 35b for the X-direction coupling portion 35 and the connecting plates 36b of the Y-direction coupling portion 36 intersect in an intergitated or interleaved manner as shown in FIG. 1, FIG. 2 and FIG. 3 so that they are able to vibrate in perpendicular directions independently of each other. Since a plurality of connecting plates 35b and 36b are provided in this structure for connecting the first and second pair of spaced plates 35a and 36a, the vibration shaft 1 is vibrated without the generation of torsional vibration such as rolling and pitching.

The operation of the vibrator constructed as disclosed above will now be described by returning to FIG. 1. When the X-direction exciter 20, the Y-direction exciter 27 and the Z-direction exciter 11 are simultaneously driven, the vibration shaft 1 is made to vibrate by these devices simultaneously in the three orthogonal directions. In this case, since the X-direction guide shafts 25, the Y-direction guide shafts 32 and the Z-direction guide shafts 17 are supported by the guides 26, 33 and 18, respectively, the vibration will be extremely good without any distorting components. Moreover, since X-direction exciters 20 and Y-direction exciters 27 are each located in pairs, a large amount of acceleration and a high frequency of vibrations are realized. Furthermore, the X-direction exciters 20 and the Y-direction exciters 27 are provided so as to surround the four sides of the vibration shaft 1, thereby providing the advantages set forth above without requiring the size of the vibrator to be enlarged.

According to the present invention, as described above, first and second joint portions formed in the interior of a hollow vibration shaft each have connecting plates which are interleaved perpendicular to each other and are crossed over one another in a mutually independent vibrating condition, and first and second exciters are coupled to the first and second joint portions respectively thereby enabling a two dimensional vibration of a single vibration shaft in the two directions perpendicular to the axial direction of the vibration shaft. Thus a small size vibrator is provided which is suitable for applying two dimensional vibrations to specimens in two horizontal directions.

Further, it is possible to easily realize a three dimensional vibrator by having a third Z-axis exciter coupled to the vibration shaft to cause vibration in the axial direction of the vibration shaft. Therefore, it is possible to provide a vibrator which has the advantages of having three dimensional or directional vibrations applied to specimens by a single vibration shaft.

While the invention has been disclosed in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. An apparatus for vibrating specimens simultaneously in multiple directions, said apparatus comprising:
   a. a hollow vibration shaft for supporting a vibration table to which specimens may be fixed;
   b. a first pair of parallel, spaced plates connected to each other and located on the interior of and in contact with said vibration shaft;
   c. a second pair of parallel, spaced plates connected to each other and located on the interior of and in contact with said vibration shaft in a direction perpendicular to the direction faced by said first parallel spaced plates,
   d. a first pair of connecting shafts inserted through first openings formed in said vibration shaft with a clearance of at least the width of vibration, said first pair of shafts being respectively connected to said first pair of parallel spaced plates for movement thereof;
   e. a second pair of connecting shafts inserted through second openings formed in said vibration shaft with a clearance of at least the width of vibration; said second pair of shafts being connected to said second pair of parallel spaced plates for movement thereof,
   f. a first exciter coupled to at least one of the first pair of connecting shafts for applying a vibration through said first connecting shaft in a first direction; and
   g. a second exciter coupled to at least one of the second pair of connecting shafts for applying a vibration through said second connecting shaft in a second direction perpendicular to said first direction.

2. An apparatus as in claim 1 wherein said first and second exciters are provided in pairs and are respectively coupled to each of said first and second pair of connecting shafts.

3. An apparatus as in claim 2 further comprising:
   a. a bearing which is slidably coupled to one end of said vibration shaft to allow axial movement of said vibration shaft, and
   b. a third exciter operably coupled to said vibration shaft for applying vibrations in the axial direction of said vibration shaft in said bearing.

4. A method of vibrating specimens simultaneously in multiple directions comprising the steps of:
   a. supporting a vibration table on a hollow vibration shaft and to which table specimens may be fixed;
   b. connecting a first pair of parallel, spaced plates to each other on the interior of and in contact with said vibration shaft;
   c. connecting a second pair of parallel, space plates to each other on the interior of and in contact with said vibration shaft in a direction perpendicular to the direction formed by said first parallel spaced plates,
   d. inserting a first pair of connecting shafts through first openings formed in said vibration shaft with a clearance of at least the width of vibration, said first pair of shafts being respectively connected to said first pair of parallel spaced plates for movement thereof;
   e. inserting a second pair of connecting shafts through second openings formed in said vibration shaft with a clearance of at least the width of vibration; said second pair of shafts being respectively connected to said second pair of parallel spaced plates for movement thereof,
   f. coupling a first exciter to at least one of the first pair of connecting shafts for applying a vibration through said first connecting shaft in a first direction; and
   g. coupling a second exciter to at least one of the second pair of connecting shafts for applying a vibration through said second connecting shaft in a second direction perpendicular to said first direction.

5. A method as in claim 4 further comprising the steps of:
   a. providing said first and second exciters in pairs, and
   b. respectively coupling said first and second exciter pairs to each of said first and second pair of connecting shafts.

6. A method as in claim 2 further comprising the steps of:
   a. slidably coupling a bearing to one end of said vibration shaft to allow axial movement of said vibration shaft, and
   b. operably coupling a third exciter to said vibration shaft for applying vibration in the axial direction of said vibration shaft in said bearing.

* * * * *